Jan. 6, 1942. J. P. WOODS 2,269,414
MULTIPLE RECORDING GALVANOMETER
Filed Oct. 16, 1939 2 Sheets-Sheet 2
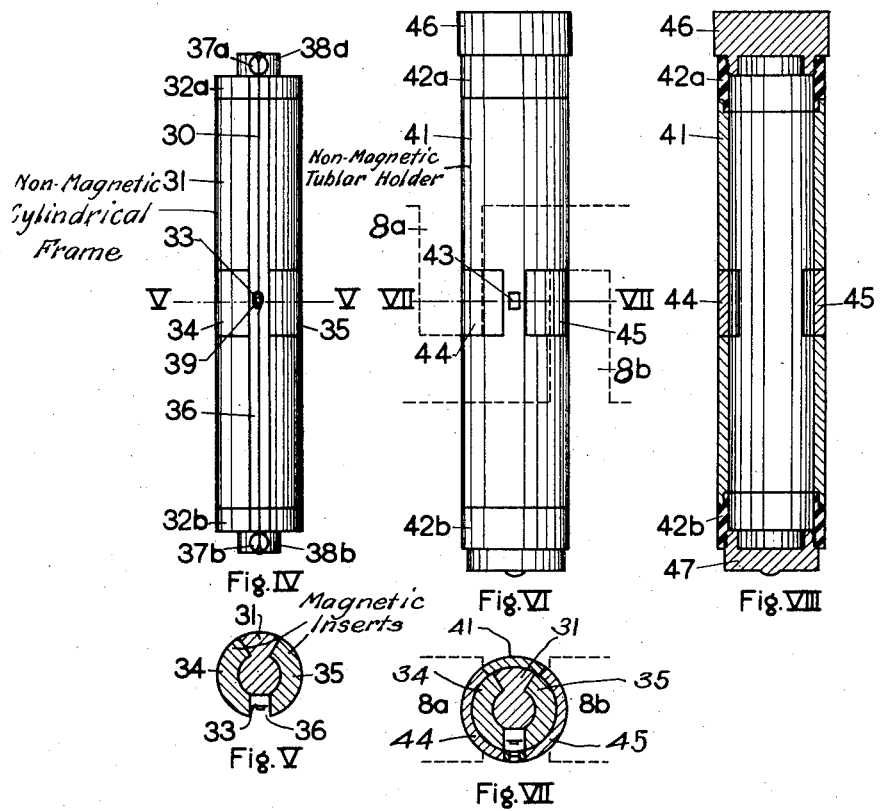
Inventor: John P. Woods
By his Attorney:

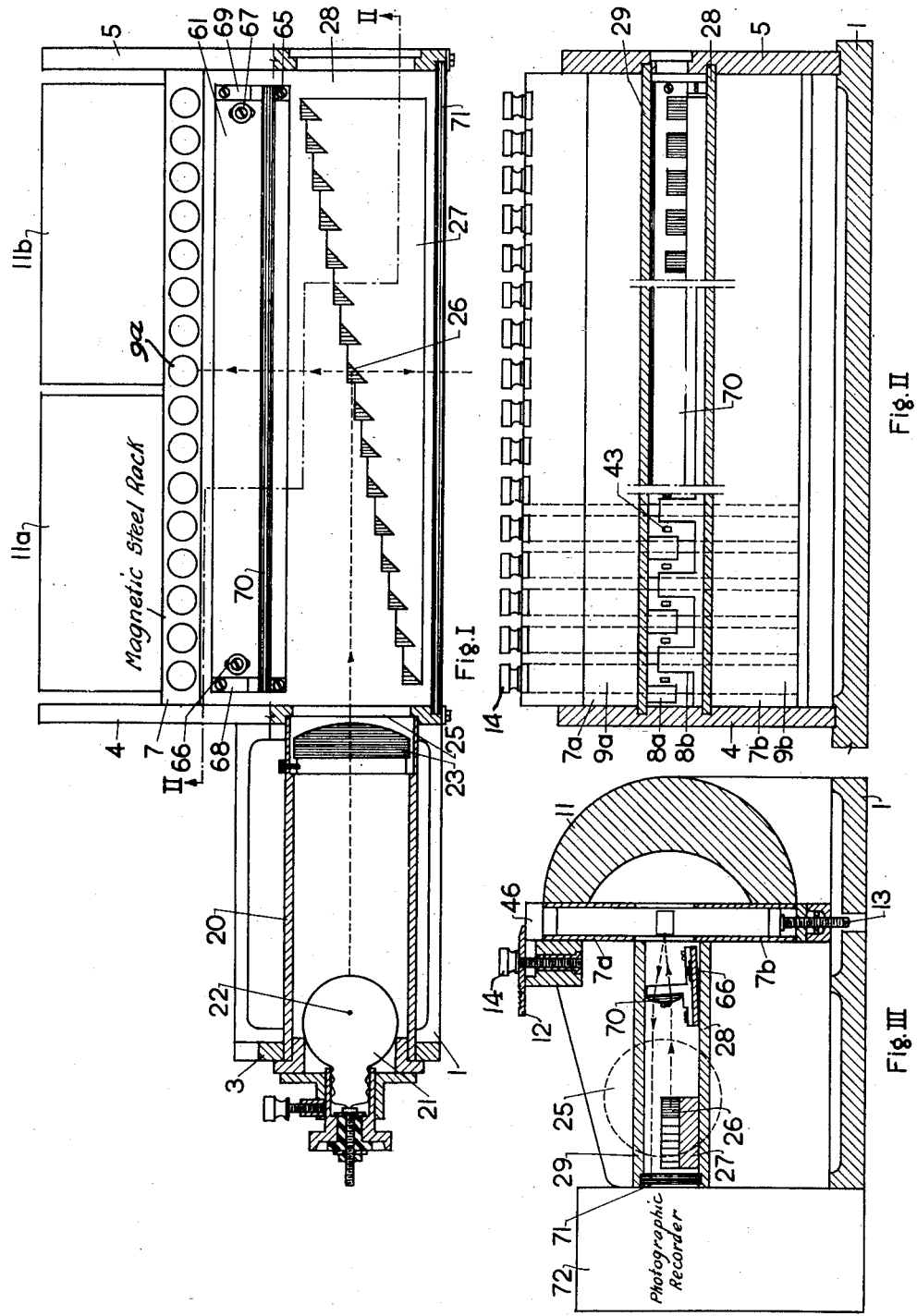

Patented Jan. 6, 1942

2,269,414

UNITED STATES PATENT OFFICE 2,269,414

MULTIPLE RECORDING GALVANOMETER

John P. Woods, Houston, Tex., assignor to Shell Development Company, San Francisco, Calif., a corporation of Delaware Application October 16, 1939, Serial No. 299,717

2 Claims. (Cl. 234—61)

This invention relates to electrical measuring and recording instruments and pertains particularly to improvements in galvanometers, and especially in multiple recording galvanometers or oscillographs.

Multiple oscillographs are used for various purposes, as, for example, in seismic surveying, wherein disturbances are artificially generated in the ground by the use of explosives, and the mechanical energy of the refracted and/or reflected seismic waves arriving at the detectors or seismometers is converted by the latter into electrical energy. The electrical impulses from one or more seismometers are usually amplified and thereafter impressed on galvanometer strings or coil elements carrying vibrating mirrors, whereby a record of the movements of the strings or coils is made by conventional photographic means. Since modern methods of seismic surveying involve the simultaneous use of a great number of seismometers, such as 24, 36, 72 or more, it becomes necessary, even though several seismometers be connected to a single galvanometer string or coil element, to use multiple oscillographs having 12, 24 or more vibrating string or coil elements.

In using multiple oscillographs wherein a photographic record is made on sensitized film or paper by means of beams of light reflected from mirrors carried by vibrating galvonometer coils mounted between magnet poles, considerable difficulties are encountered in directing and focussing the necessary amount of light to the reflecting mirrors, to obtain clear records, and especially, in view of the extremely small size of said mirrors, in adjusting the position of each individual mirror in such manner that the beam reflected therefrom is properly directed and focussed on the particular track assigned for the oscillations of said beam on the sensitized seismogram film or paper, considerable and costly delays being often caused by the necessity of individual adjustment of said mirrors for proper reflection of the light beams in both the horizontal and the vertical planes.

It is, therefore, an object of this invention to provide a multiple recording galvanometer or oscillograph wherein the adjustment of the several vibrating coil mirrors to a correct position is facilitated by providing for the coil elements separate cartridge-type holders removably mounted between the magnet poles of the oscillograph whereby the light beams passing to and from said mirror can be easily adjusted in a horizontal plane by rotating said holders.

It is also an object of this invention to provide a multiple oscillograph having a single cylindrical or semi-cylindrical lens mounted between the source of light beams and the several coil mirrors, and adapted to direct the light beams passing to and from said mirrors along parallel planes, whereby the beams reflected from said mirrors are inherently directed to their proper tracks on the sensitized recording means, and the necessity for adjusting the mirrors for proper reflection in a vertical plane is eliminated or minimized, the intensity of illumination of said mirrors being furthermore intensified by said cylindrical lens.

These and other objects of the present invention will be understood from the following description taken with reference to the annexed drawings wherein:

Fig. 1 is a plan view, partly in cross-section, of the recording galvanometer or oscillograph of the present invention with the cartridge-holding clamp screw arrangement removed;

Fig. 2 is a partial front elevation view in section of the apparatus of Fig. 1, the cross-section being taken along the line II—II of Fig. 1;

Fig. 3 is a side elevation view partly in cross-section of the device of Fig. 1;

Fig. 4 is an elevation view of the present galvanometer coil frame element;

Fig. 5 is a cross-section view taken along line V—V of Fig. 4;

Fig. 6 is an elevation view of the present cartridge-type galvanometer coil holder element;

Fig. 7 is a cross-section taken along line VII—VII of Fig. 6;

Fig. 8 is a vertical cross-section of the device of Fig. 6; and

Fig. 9 is a diagram showing the paths of the beams travelling through a cylindrical lens.

The recording galvanometer or oscillograph shown in Figs. 1, 2, and 3 comprises a base plate 1, made of aluminum or other suitable non-magnetic material, preferably mounted on a rubber cushion (not shown). The base 1 carries at least three vertical walls 3, 4 and 5, which support the remaining parts of the apparatus. Mounted between plates 4 and 5 is a steel rack 7 adapted to hold the galvanometer coil elements, to be described later. The rack 7, which is preferably made of a special magnetic steel and is cadmium-plated, consists of an upper plate 7a and a lower plate 7b, said plates carrying respectively a plurality of pole pieces 8a and 8b integral with said plates, the pole pieces of plate 7a facing those of plate 7b and being staggered with regard thereto as shown in Fig. 2. A row of cylindrical holes 9a, of a suitable diameter, such as ⅜" are drilled through the plate 7a, and a corresponding row of holes 9b are drilled in register therewith in plate 7b and serve as wells to receive the galvanometer coil cartridges, the opposite vertical faces of the pole pieces adjacent said cartridges being suitably machined to form concave cylindrical surfaces fitting snugly around said cartridges.

A permanent magnet 11, which may be made in the form of separate sections 11a and 11b, is affixed to the back of the rack 7, and is held by magnetic force, whereby all the pole pieces 8a are given similar polarity opposite that of the pole pieces 8b.

The cartridge elements are held in their place in wells 9 by means of screws 14, suitable clamp and pin contacts being provided at 12 and 13 for electrically connecting the galvanometer coils within said cartridges into the desired seismometer and amplifier circuits, the elements 14 and 12 not being shown in Fig. 1 for clearness.

The galvanometer coil cartridges shown in Figs. 4–8 consist of an inner element comprising a cylindrical frame 31, made of a non-magnetic metal, such as copper, brass, aluminum, etc., carrying about its middle portion two semi-annular machined inserts 34 and 35, not in contact with each other, made of steel or other suitable magnetic material. Two insulating discs 32a and 32b made of Bakelite, hard rubber, etc., are arranged at or near the opposite ends of the cylinder 31. A longitudinal slot 36 is formed along the periphery of cylinder 31 and discs 32a and 32b, and serves as a housing for the galvanometer string 30, preferably formed of an oxidized aluminum ribbon of extreme thinness, for example, having cross-section dimensions of 0.0035" by 0.0002". This ribbon is stretched between pins 37a and 37b carried by metallic non-magnetic knobs 38a and 38b affixed to the outside of discs 32a and 32b and therefore insulated from the body of the frame. The string 30 is wound in its middle portion, between the inserts 34 and 35, to form a coil 33, comprising, for example, about 15 loops electrically insulated from each other by the oxide coating of the aluminum wire. An extremely small mirror 39 is affixed, for example, by cementing, to said coil 33.

The frame comprising the elements 30—39 is inserted into a tubular holder, having a main body portion 41, made of a metallic non-magnetic material similar to that of cylinder 31, semi-annular inserts 44 and 45, corresponding to and made of a magnetic material similar to that of inserts 34 and 35, and annular elements 42a and 42b made of a non-conducting material and serving to insulate the metallic non-magnetic cap 46 and bottom plug 47 from the body of the holder. A window 43, suitably closed with a piece of glass, quartz, or other transparent material, is provided through the body of the holder between the inserts 44 and 45.

When the frame 31 is inserted into the holder 41 and fits snugly within the latter, the magnetic inserts 34 and 35 are substantially in register and contact with inserts 44 and 45, which in turn are in contact with the pole pieces 8a and 8b shown in dotted lines in Fig. 6. The window 43 is in register with the mirror 39, whereby a beam of light may be passed to said mirror and reflected therefrom. The electric circuit of the galvanometer coil is closed through the screw clamp 14 and 12, cap 46, knob 38a, pin 37a, galvanometer string 30, pin 37b, knob 38b, plug 47 and adjustable pin 13, the leads from a desired seismometer or amplifier circuit being connected to said clamp 12 and pin 13.

By rotating the galvanometer cartridge by means of its cap 46, the mirror 39 may be easily adjusted for a proper position in a horizontal plane to direct reflected beams to the proper track on the sensitized recording means.

The optical system of the present apparatus comprises a lamp housing 20, affixed between walls 3 and 4, in which is mounted a lamp 21, having a line filament 22, or any other suitable source of light. The housing 20 comprises a condenser lens 23, the vertical line-filament of the lamp being in the focal plane of the lens. Parallel beams of light are therefore directed through an opening 25 in plate 4, on a series of prisms 26 arranged in a step-wise manner on a plate 27 placed on a shelf 28 supported between walls 4 and 5. The prisms 26 are affixed to the plate 27 in any suitable manner, for example, by cementing and serve to deflect the light coming from the lens 23 towards the windows 43 of the galvanometer coil elements.

A base 61 is tiltably mounted on shelf 28 by means of screws 66 and 67, and supports a cylindrical or semi-cylindrical lens 70, held by brackets 68 and 69 between the prisms 26 and the windows 43 of the cartridge galvanometer elements.

Referring to the path of the light beam shown in dotted lines in Figs. 1 and 3, it will be seen that as the light proceeds from the vertical filament of the lamp through the condenser lens 23, the center line of the beam of light leaving the condenser lens 23 is horizontal, and the rays of light emanating from any point of the line filament are parallel after passing through said lens.

A portion of the light passing through the condenser lens 23 falls upon the prisms 26. The sixteen prisms shown on the drawings (or any other number of prisms which may be used) deflect a corresponding number of horizontal beams of light towards the galvanometer rack. These sixteen horizontal beams of light pass through the lower half of the cylinder lens 70, the latter decreasing the vertical spread of the beams, concentrating them on the window of the galvanometer elements, as shown in Fig. 3, whereby the amount of light received by the galvanometer coil mirrors is increased by a factor of approximately three or four. That portion of each beam which falls upon the galvanometer coil mirror is reflected back towards the cylindrical lens, as shown in Fig. 3. At this place, the beams are diverging rapidly in a vertical plane, and the axis of each beam is not horizontal but is tilted upward. Owing to the extremely small size of the galvanometer coil mirrors, it is practically impossible to cement them to the coils in truly vertical positions; hence the axes of the beams are tilted at slightly differing angles.

The reflected beams pass next through the upper half of the cylindrical lens 70, which eliminates or minimizes the divergence and also makes the axes of the beams substantially horizontal. The necessity for a truly vertical adjustment of the galvanometer coil mirrors is therefore obviated. After passing through the upper portion of the cylindrical lens 70, the beams pass over the prisms 26 and emerge through a glass slot-window 71, provided between the shelf 28 and a shelf 29. These shelves are held between walls 4 and 5 and rack 7a, and enclose the space containing the prisms 26 and the cylindrical lens 70. The beams passing through the window 71 enter a photographic record receiving device 72 in communication with the window 71. The photographic record receiving device, 72, contains a cylindric or semi-cylindric condensing lens, photographic film or paper, and means for driving this film or paper. This record receiving device is of conventional construction and is therefore not shown in detail in the drawings.

It will, therefore, be seen that the cylindrical or semi-cylindrical lens 70 interposed according to the present invention between the source of the light and the galvanometer coil mirrors differ in purpose and effect from cylindrical lenses sometimes interposed in oscillograph systems between the beams of light reflected from the galvanometer coil mirrors and the recording or observation medium, such as sensitized film or paper or ground glass. These last cylindrical lenses are strictly condensing lenses, and serve to concentrate the light from the reflecting mirror onto the sensitized medium. The cylindrical lens of the present invention, on the other hand, serves primarily the purposes of concentrating the light on the mirror and increasing the intensity of illumination of the latter, and of returning the various divergent beams with tilted axes reflected by the mirrors to substantially non-divergent beams having substantially horizontal axes, said beams passing over the tops of the prisms through which light passes on the way to the mirrors. It will be seen that the use of this cylindrical lens eliminates the necessity of a truly vertical adjustment of the galvanometer mirrors, since any reasonable deviation of the latter from the vertical will not result in reflected beams deviating from the desired horizontal path to the recording means, but merely in a relatively negligible loss of light between the mirror and the lens, the remaining light received by the lens, whatever its angle of tilt, being refracted by the lens to a substantially nondivergent horizontal beam and directed towards the sensitized recording means.

This will further be understood by reference to Fig. 9 of the drawings diagrammatically showing a beam A travelling from one of the prisms through the lower segment of the lens 70 to a galvanometer mirror 39 and reflected therefrom as a beam B. 90 and 91 being respectively the axes of the direct and of the reflected beams, the reflected beam B has an angle of divergence $\phi$ and an angle of tilt $\theta$, said angle $\theta$ being a function of the deviation of the mirror 39 from the vertical. It will be seen that regardless of the value of $\theta$, within reasonable limits, the axis 91 of beam B is horizontal after passing through the upper segment of the lens 70, said lens concentrating light on the mirror 39, and also eliminating from the beam B both the divergence angle $\phi$, and the tilt angle $\theta$.

It should, furthermore, be understood that the plane in which the reflected beams travel from the lens to the recording means is defined in this specification and claims as horizontal and parallel to the plane in which the beams travel from the prisms to the lens only for purposes of brevity. In practice, these two planes are only substantially or approximately parallel, since it is usually desirable to maintain the cylindrical lens 70 in a position slightly tilted away from the galvanometer mirrors. This is done because all the light from the prisms 26 does not pass through the lens, some of it being reflected at the air-glass interface, and the tilting of the lens deflects this light upwards so that it does not strike the recording means. This adjustment of the lens may be easily effected by means of the screws affixing the lens to the supporting shelf.

I claim as my invention:

1. In a multiple recording galvanometer system comprising a source of light, a plurality of reflecting galvanometer elements spaced along a substantially straight horizontal line and a photographic record receiver, light train means to direct light beams from said source to said elements and from said elements to said record receiver, said means comprising an elongated lens having a cylindrical face, the longitudinal axis of said elongated lens being parallel to the line of the reflecting elements in a horizontal plane, said lens having a segment to one side of said plane positioned in the path of the beams travelling from the source of light to the reflecting elements, and a segment to the other side of said plane positioned in the path of the beams travelling from the reflecting elements to the record receiver, whereby said beams are caused to travel along substantially parallel vertically spaced paths on that side of the lens which is away from the reflecting elements.

2. In a multiple recording galvanometer comprising a plurality of reflecting galvanometer elements spaced along a substantially straight horizontal line and a record receiver, a light-train system comprising a source of light beams, a plurality of prisms in the path of said beams for deflecting said beams towards said reflecting elements, said prisms being unequally spaced from said reflecting elements in a step-wise arrangement, an elongated lens having a cylindrical face between said prisms and said reflecting elements, the longitudinal axis of said elongated lens being parallel to the line of the reflecting elements in a horizontal plane passing above the top of said prisms, said lens having a segment positioned below said plane in the path of the beams travelling through said prisms, whereby said beams are directed to said reflecting elements, and a segment positioned above said plane in the path of the reflected beams travelling from said reflecting elements, whereby said second beams after passing through said lens are caused to travel toward said record receiver above the top of said prisms along a path substantially parallel to the path after deflection of said first beams.

JOHN P. WOODS.